March 2, 1971   D. H. OGDEN   3,566,447

MOULDING EQUIPMENT

Filed Jan. 25, 1968   3 Sheets-Sheet 1

Inventor
Dennis Henry Ogden
By Cushman, Darby & Cushman
Attorneys

March 2, 1971    D. H. OGDEN    3,566,447
MOULDING EQUIPMENT

Filed Jan. 25, 1968    3 Sheets-Sheet 2

March 2, 1971 D. H. OGDEN 3,566,447
MOULDING EQUIPMENT
Filed Jan. 25, 1968 3 Sheets-Sheet 3

Inventor
Dennis Henry Ogden
By Cushman, Darby & Cushman
Attorneys

United States Patent Office 3,566,447
Patented Mar. 2, 1971

3,566,447
MOULDING EQUIPMENT
Dennis Henry Ogden, Dudley, England, assignor to British Industrial Plastics Limited, Manchester, England
Filed Jan. 25, 1968, Ser. No. 700,559
Claims priority, application Great Britain, Feb. 6, 1967, 5,551/67; Sept. 27, 1967, 43,970/67
Int. Cl. B29c 1/02
U.S. Cl. 18—35
9 Claims

ABSTRACT OF THE DISCLOSURE

A mould for use in a cold-moulding process comprises a pinch-off of resilient material, suitably a rubber. Better control of resin flow and reduced wear of the mould proper is obtained. Cold-press moulds are described which are of glass-reinforced polyester, with or without a plastics foam backing, moulds of plastics foam alone, and moulds adapted to accept inserts to be moulded into a moulding.

---

This invention relates to improvements in moulding equipment and to the use of such equipment in the cold-press moulding of reinforced plastics products.

Cold-press moulding is a recently developed process for the moulding of reinforced plastics materials, for example glass fibre reinforced unsaturated polyester and epoxy resins. Conventional cold-press moulding techniques employ as the mould what is effectively a pair of easily distortable male and female mould halves, themselves made of polyester or an epoxy resin composition, which are supported and strengthened by a relatively massive backing of concrete, a resin/aggregate composition or a similar material.

The principle of cold-press moulding is essentially to use the heat evolved in the exothermic cure of a suitable resin/catalyst combination to accelerate cure of the resin, by retaining as much of the heat as possible in the moulding. Heat is retained in the mould between pressings, so that its temperature gradually rises. However, although the process is known as cold-press moulding, it is quite common to include in the mould some means of heating it, for example by a network of resistance wires.

In practice the reinforcement, usually in the form of a mat of glass fibre, is cut roughly to the shape of the desired finished moulded product, and the shaped mat is then placed (optionally after applying an initial gel coat of resin to one or both mould halves) into the mould—usually the female—so that its edges overlap the edge of the mould and in consequence are trapped by the lands of the mould as it is closed (these parts of the mould which grip the overlapping reinforcement, and which restrict the edges of the mould cavity may conveniently be referred to as the "pinch-off"). An appropriate quantity of a suitably catalysed resin is next placed into the mould, which is then closed. Pressure is applied as necessary, and cure of the resin proceeds to the point where the moulding is sufficiently hard to be removed from the mould without risk of undesirable distortion. It will be understood that because of the presence of reinforcement in the pinch-off area, tight closure of the mould (such as might be obtained with a metal mould giving a clean cutoff as it chops off superfluous reinforcement) is not possible; gaps may be left and as a consequence excessive outflow of resin through the pinch-off is not uncommon. Also, when the mat is folded or creased, as sometimes occurs when a complicated moulding is being made and the mat cannot be tailored accurately to lie flat on the pinch-off, excessive pressure is exerted on the pinch-off in the region of the fold, frequently with eventual fracture of the mould at that point. Quite complicated pinch-off devices, ranging from sharply angled regions to steel strips embedded in the moulds, have been described, for example in an article in "Reinforced Plastics," published in London by Craftsman Publication, vol. 10, No. 1, September 1965, at pp. 15–20.

Other disadvantages of the conventional cold moulding technique are that the moulds are often very heavy (several hundred pounds in weight when concrete backing is used for even a moderately sized mould) and consequently require large and cumbersome apparatus for their manipulation.

The present invention provides improved moulds for use in cold moulding processes.

We have found that an improved mould can be obtained by making at least part of the pinch-off surface of the mould from a suitable resilient material.

The nature of this resilient material will depend upon the degree of compressibility required and the temperatures and chemicals which the material will be called on to withstand.

The degree of compressibility of the material of the pinch-off can vary within quite wide limits, but given the performance required and the properties of materials available the man skilled in the art will have no difficulty in selecting a material suitable for the purpose. We have found that rubbers, either natural (although these may sometimes not be suitable due to chemical attack) or synthetic, provide a useful range of materials from which the pinch-off can be made. A hardness of 10–100° Shore is suitable, particularly 50–80° Shore. Our preference is for neoprene of about 75° Shore hardness.

The pinch-off preferably consists of a gasket or narrow strip of resilient material suitably disposed around the edge of the mould and, often, serving also to shape the boundaries of the moulding. Although it may simply be attached, as by suitable adhesive, to the mould, it is preferably set in a shallow groove cut in the material of the mould, again preferably held in position by means of an adhesive. We have used an epoxy resin adhesive very successfully for this purpose but, of course, a range of suitable adhesives are available and the selection of one will present no problem to the skilled man.

The resilient pinch-off may form either one or both contact surfaces of the two-part mould, and both arrangements are shown in the drawings.

We have found that the use of a resilient pinch-off as described is advantageous in that it can assist in preventing uneven outflow of resin from the filled mould when pressure is applied to it. Thus, by having the resilient pinch-off made of fairly highly compressible material, and using a pinch-off thicker than the actual moulding is required to be, actual pinch-off of the edges of the moulding can occur before any significant pressure is applied to the material in the mould cavity. Application of pressure to the mould and hence to the pinch-off then merely compresses it.

It has been mentioned that conventional concrete-backed moulds are often very heavy and cumbersome, and we have found that surprisingly it is quite possible to make the moulds from a suitably strong plastics material without strengthening backing. Particularly suitable for this purpose is a glass reinforced polyester composition, the mould being sufficiently thick or so shaped (e.g., by appropriate ridging) that it is sufficiently rigid to be used in the cold-press moulding process. Such a mould, because it is usually relatively thin-walled compared with conventional cold-press moulds, may conveniently be called a "shell mould."

If necessary the rigidity of the shell mould can be increased by attaching it, conveniently by means of bolts through suitably disposed flanges, to a supporting framework of, say, steel bars, which may form part of a press in which the moulds are carried when in use.

The actual thickness of mould required will depend upon its size and shape, but for a simple two-part shell mould of glass reinforced polyester for a rectangular bowl 75 cm. x 45 cm. x 15 cm. deep, a mould thickness of 6 to 12 mm. (for each half of the mould) has been found to be quite adequate. The thickness of the mould in any particular instance can easily be determined by simple trial.

For a simple mould such as the one described above it is quite sufficient for supporting bars to support only the longer sides of the mould, but it may be desirable, for more complicated or larger moulds, to have other supporting surfaces, for example bars passing underneath the mould or attached to flanges on all sides of the mould. The supporting bars can be made adjustable to accommodate moulds of different dimensions and shapes.

We have also found it advantageous on occasion to employ a foamed plastics material as a backing to the shell moulds of the invention, the backed moulds so obtained being relatively light and having desirable thermal characteristics.

Low strength foams will generally be employed as backing for rigid mould liners which are able to retain their shape under moulding conditions; stronger and more dense foams, for example polyurethane foams of density greater than, say, 25 or 50 kg./cu. m. and particularly greater than 75 or even 100 kg./cu. m., have been used with relatively easily distortable shell moulds made of quite thin polyester resin/glass laminate or epoxy resin. The less dense, weaker foams may also need support, for example by enclosing them in a suitable "box" of say, wood, although a simple framework, such as of angle iron, has been found satisfactory with some of the stronger and more dense foams. With the stronger foams, for example, polyurethane foam of density of the order of 100 or 125 kg./cu. m. or more, it has been possible simply to bolt or clamp a block of the foam directly on to a suitable mould cradle.

In a further modification of this aspect of the invention, it has been found possible when using a suitably strong and dense foam such as, for example, polyurethane foam of density between about 75 and 500 kg./cu. m., particularly between about 100 and 250 kg./cu. m., to use the foam itself as a mould without the use of a shell mould. A very considerable advantage of the use of a foam mould without a shell mould, or with perhaps only a very thin mould liner which itself has nonstick or "parting" properties, is that the shaping of the mould, which is a time-consuming and costly procedure, can be cheapened and accelerated, since the mould can be made simply by applying the uncured foam or foaming liquid to the pattern and subsequently curing the appropriately shaped foam to the solid state.

The selection of a suitable plastics foam and density thereof for this purpose will present no difficulty to the skilled man, so long as the conditions under which the mould will be employed are kept in mind. Thus, it should be remembered that the exotherm developed in curing polyester may cause the foam to melt or at least distort. Again, the rate of cure of the polyester, nature of catalyst, accelerator, etc., will influence the amount of exotherm. It may be desirable to strengthen the foam moulds of the invention for example by incorporating in them, at the foaming stage, reinforcing material such as glass, natural fibres such as cotton fibres, or synthetic fibres such as viscose rayon. We have found thermosetting foams such as polyurethane, silicone and epoxy foams to be useful in this aspect of the invention.

Conventional parting agents such as polyvinylalcohol and wax may be used in conjunction with moulds made according to the invention, but where foam moulds are used without a liner, it may be possible to avoid the use of parting agents completely, because the surface of the foam itself may have adequate nonstick characteristics—this may be the case with polyurethane and silicone foams, for example—or it may be possible to incorporate a permanent parting agent into the mould, for example by coating with a parting agent capable of reacting chemically with the face of the mould. Thus, a long-lasting coat of polyvinyl alcohol has been applied to polyurethane mould faces by painting the pattern with polyvinylalcohol solution before application of the uncured foam as foaming liquid. Presumably reaction occurs between the polyvinyl alcohol and the isocyanate groups in the foam.

In general, it can be said that the novel shell moulds and foam or foam-backed moulds of the invention should have a thermal capacity of less than 0.4, preferably less than 0.3 and more preferably less than 0.15 cal./cm.$^2$/° C., and have a thermal conductivity of less than 0.002, preferably less than 0.0015 and more preferably less than 0.001 cal./sq. cm./sec./cm./° C.

The attached drawings illustrate the invention as so far described. Thus,

The mould halves 1 and 3, illustrated in FIGS. 1 and 2 were prepared as follows. A male pattern was made to the desired shape and after preparing the surface by application of several coats of air-drying furane resin (rubbing down between each coat) and coating the smooth surface with a conventional polyvinyl alcohol release agent, an initial thin layer of a tough isophthalic gel resin was applied (about .0125 cm. thick). This coat was cured, a layer of surface tissue cut and laid into place, and a second gel coat applied and cured. The amount of gel coat employed was just sufficient to give good wet-out of the tissue. The mould was then built up to full thickness using ordinary chopped strand mat and a high heat distortion general purpose unsaturated polyester resin. (After this has gelled any strengthening ribs which may be required—although not used in the example—may be laid up in position.)

When fully cured the mould half 3 is removed from the pattern, the edges trimmed, the pinch-off 4 inserted into a groove provided. Wax is then laid down in the female mould to the thickness of moulding required and the male mould then made on the wax in the usual way.

After hardening of the mould (about 2–3 days), holes 2 for retaining bolts and, if necessary, pilot holes for guide dowels for mould alignment, are drilled in the lateral flanges provided.

Figure 1:
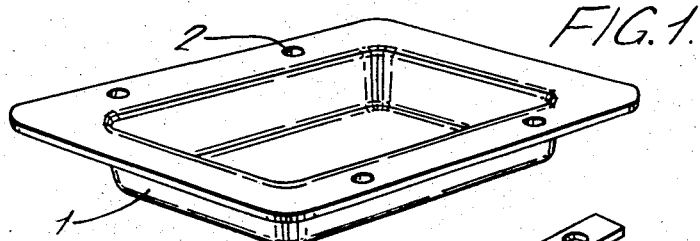
FIG. 1 is a perspective view of a male mould half (or "punch")
Figure 2:
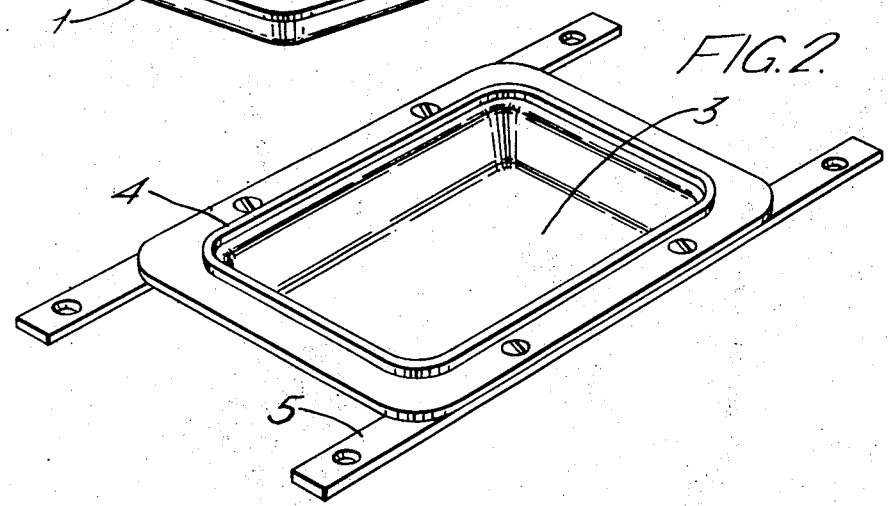
FIG. 2 is a perspective view of a female mould half, bolted to supporting bars.

In FIGS. 1 and 2 the components illustrated are for a basin mould, of dimensions about 75 cm. x 45 cm. x 15 cm. and each of the moulds, built up as described, has a wall thickness of about 6 mm.

Figure 3:
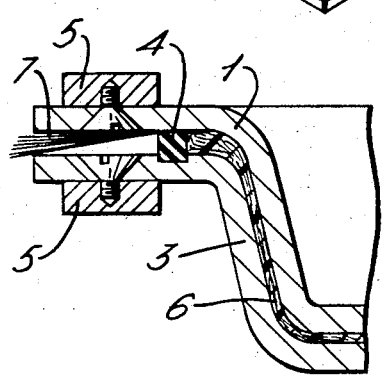
FIG. 3 is a vertical section through a portion of a closed mould comprising mould halves shown in FIGS. 1 and 2.
Figure 4:
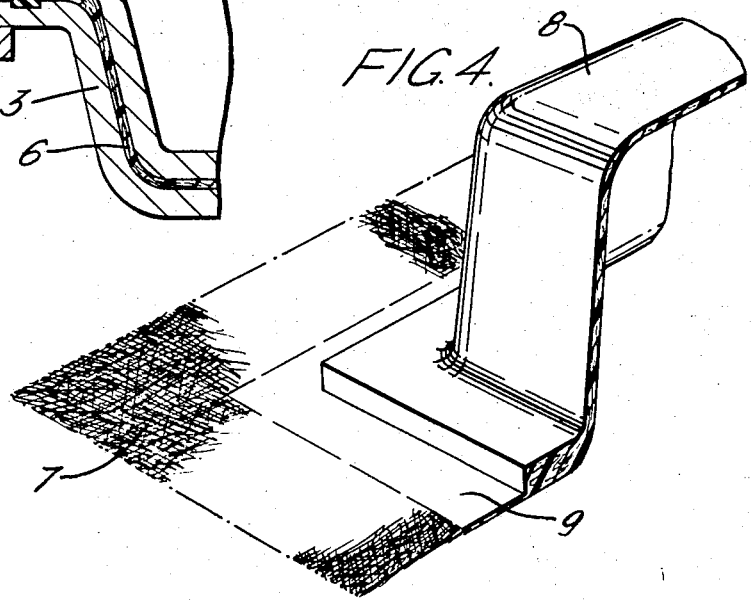
FIG. 4 is a perspective view of part of a moulding obtained as shown in FIG. 3.

Also illustrated in FIG. 2 is the resilient pinch-off 4 (in this case the pinch-off is of neoprene of 75° Shore hardness; it is about 9 mm. wide and stands when uncompressed about 6 mm. from the groove of the mould), which is set in a groove—in this mould only one contact surface of the pinch-off is of resilient material. The pinch-off marks the limit of the mould cavity, and hence of the moulding, as will be seen from FIGS. 3 and 4. In FIG. 3, which shows the shell mould halves of FIGS. 1 and 2 in use, the mould cavity is shown filled in the conventional way with a glass fibre/unsaturated resin/catalyst composition 6, and the pinch-off 4 is seen embedded in its groove pinching the glass fibre mat (the surplus of which is shown by 7) so that it is held firmly in position without excessive escape of resin. The resultant appearance of part of the rough moulding as it is removed from the mould is shown in FIG. 4, where reference 9 indicates the part of the moulding which was compressed by the pinch-off and 7 is the loose surplus glass fibre. The moulding is completed by trimming off the edges of the moulding as desired, normally by cutting off parts 9 and 7. Bars 5, shown in section in FIG. 3 as being bolted to the mould halves 1 and 3, are means whereby the moulds are carried in the press, which can be of any convenient kind. We use a simple hydraulic press.

The use of the resilient pinch-off is described here in connection with shell moulds, but of course its use is not limited to such moulds and it can be used either with conventional cold-press moulds or with any of the novel moulds described herein.

Difficulty has been experienced in using the cold-press moulding process to mould deep-draw articles (such as containers) and items of similar shape.

A major cause of this difficulty is the tendency for displacement of reinforcement to occur when flow of the resin is produced as a consequence of the pressure applied when the mould closes and we have found that by use of suitably disposed resilient pinch-offs to hold the reinforcement in position, deep-draw articles can be moulded by cold-press moulding techniques. This aspect of our invention will be illustrated by reference to two applications; one is the production of a "collar" for attachment to the end of a concrete pipe whereby convenient connection with another pipe may be accomplished; the other application is the production of a deep-draw container having integral sides and bottom.

Figure 5:
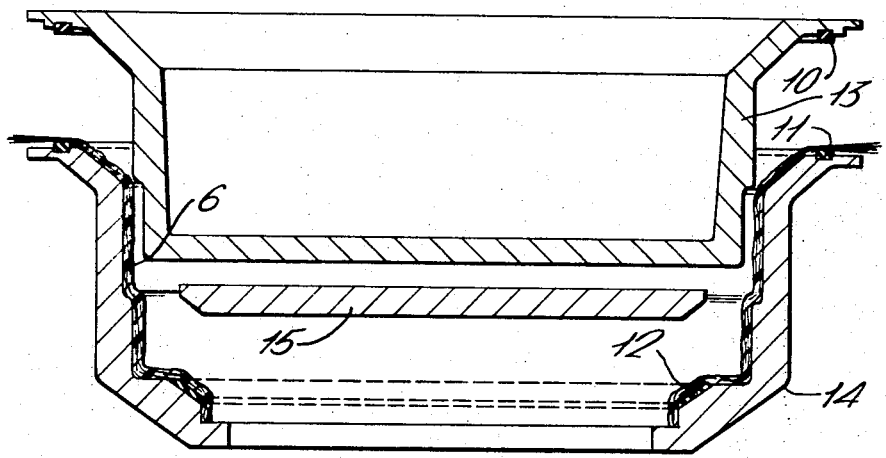
Figure 6:
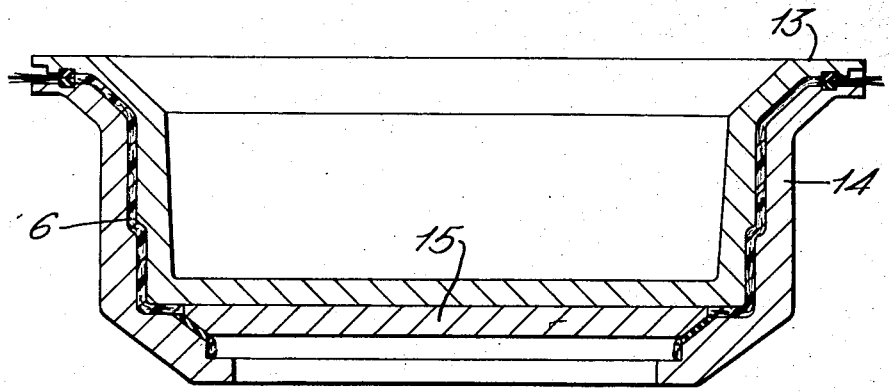
Figure 7:
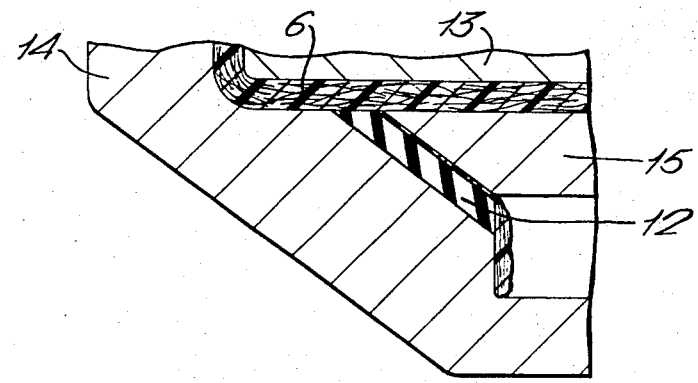

FIGS. 5, 6 and 7 are included to illustrate this aspect of the invention, in which:

FIG. 5 is a vertical section of the parts of a shell mould which in plan view is circular;

FIG. 6 is a vertical section of the same mould after closure;

FIG. 7 is a vertical section of a modification of part of the mould shown in FIG. 6.

In making a deep-draw collar we have used a shell mould as illustrated in FIGS. 5 and 6 but of course the principle can be applied to conventional techniques also. The mould illustrated is a three-part mould comprising a female component 14, a punch or male component 13 and a retaining disk 15. Embedded in, but standing slightly out from each of the mould components are three neoprene pinch-off rings 10, 11, 12. All three of these are annular pieces, 10 and 11 being so arranged that they meet when the mould is brought to the closed position and form a pinch-off which holds the glass fibre reinforcement firmly in place and marks the limits of the moulding, while ring 12 forms a bearing surface for retaining disk 15 when it is in position in the female component.

In using a mould such as that illustrated in FIGS. 5 and 6 to form a G.R.P. collar, after application of the parting agent to the mould surfaces a strip of glass fibre mat of desired weight and thickness is placed in the mould as shown, one edge of the mat being draped over pinch-off ring 11 and the other end being arranged so that it falls over pinch-off ring 12. Retaining disk 15 is then placed in the position shown in FIG. 6 so that the glass reinforcement is gripped between pinch-off ring 12 and the disk 15. A suitable quantity of catalysed resin of the desired type is then poured into the mould and the punch 13 is then inserted, if necessary guided by suitably disposed aligning means such as dowels (not shown), and the mould is closed, with the application of pressure, to the position shown in FIG. 6, where the pinch-off rings 10 and 11 have come together and further closure of the mould components 13 and 14 is prevented by contact of mould half 13 with disk 15. The pinch-off rings grip and hold in position the glass reinforcement, and substantially prevent leakage of resin out of the mould. The resin/glass mixture 6 is then allowed to cure. After cure the mould is opened, the moulding removed and surplus glass and resin trimmed off.

A modification of this moulding system is illustrated in FIG. 7, where the retaining disk, unlike that in FIGS. 5 and 6 is sufficiently thin to leave a gap between it and the punch 13 when the mould is fully closed, to accommodate resin and glass. By this means, a deep-draw container can be moulded as follows.

A strip of glass reinforcement is draped around the walls of the mould, as described above for the production of the polyester collar, the retaining disk is placed in position as before, and a circular disk of glass fibre mat is placed over the retaining disk, its edges overlapping the edges of the glass strip already in position in the mould. This is illustrated in FIG. 7, which shows the glass strip being gripped by the edge of retaining disk 15. Again, the catalysed resin is poured into the mould and the mould closed under pressure until the resin is sufficiently cured. By this means a container having an integral base can be obtained after trimming off excess glass and resin.

A further difficulty experienced in cold-press moulding is the attachment of inserts into mouldings and we have found that it is possible to mould inserts into mouldings during the cold-press moulding process by providing suitable anchorages for the inserts in the moulds employed, so that attachment means project from the mould wall into the mould cavity and can be incorporated into the moulding.

Figure 8:
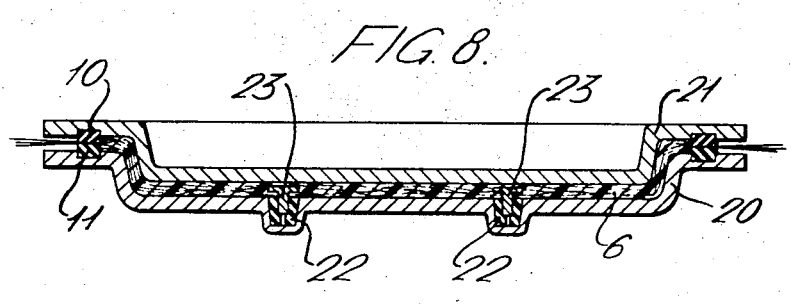
Figure 9:
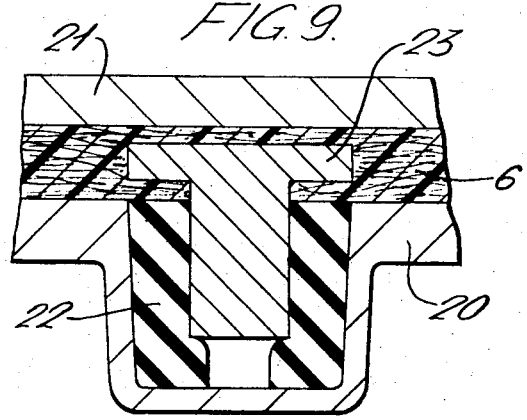

An embodiment of this development is illustrated in FIGS. 8 and 9 of the attached drawings, in which:

FIG. 8 is a section of a mould (in the closed position);

FIG. 9 is an enlarged view of the section shown in FIG. 7.

FIG. 8 shows a cold-press mould (this development may be employed either with conventionally backed moulds or the novel moulds described above) in the closed position, that is, mould halves 20 and 21 are in the moulding position and within the mould is a catalysed polyester resin/glass reinforcement mixture 6. Mating rubber pinch-off rings 10 and 11 are employed as the pinch-off.

Moulded into the wall of the mould are holders 22 of suitably flexible material, so arranged that their surfaces are flush with the inner surface of the mould and having holes in which inserts can be held while moulding takes place (for small inserts, such as positioning pegs, we have very successfully employed ordinary laboratory rubber bungs as holders). In the moulding operation, the insert is held in the holder, for example as shown in FIG. 9, the reinforcement and resin 6 are applied over and around the attachment means whereby the insert is to be held in the moulding, the mould is closed, and after curing is sufficiently complete, the moulding is removed from the mould, the inserts being retained in the moulding and pulled out of the flexible holders.

We have found it advantageous sometimes to add further strengthening material around the attachment means to reduce the possibility of the insert being torn from the moulding.

This development is not limited to the handling of small inserts only. Larger inserts may be held in this way too, using flexible holders shaped so that the temporarily retained insert may easily be removed from them when the moulding is removed. Inserts have been moulded into the sides of mouldings by forming a sufficiently large part of the wall of the mould of suitable flexible material so that detachment of the insert from the holder is possible.

The material of the holder must, of course, be able to withstand without significant change the conditions employed in moulding. As with the pinch-off, selection of a suitable material from which the holder can be made will not be difficult when properties of flexibility and temperature and chemical resistance required are known. Again we have found that rubbers, particularly synthetic rubbers, are very suitable. The holder will of course usually be located in and supported by a suitably shaped depression in the wall of the mould proper, as illustrated in FIG. 9.

EXAMPLE 1

We have made a glass fibre reinforced polyester (G.R.P.) bowl using moulds as illustrated in FIGS. 1 and 2 as follows.

The mould halves used were made from Beetle 4128 unsaturated polyester resin and had a thermal capacity of 0.24 cal./cm.$^2$/° C. and a thermal conductivity of 0.0008 cal./sq. cm./sec./cm./° C.

The mould halves were carried in mould cradles each consisting of a rectangular open boxlike structure of angle iron girders. The mould cradles form part of a hydraulic press whereby the mould halves can be brought together under suitable pressure to form the mould. (The pressure required for cold-press moulding is usually recommended as being 0.1–5.0 kg./sq. cm. on the developed area of the moulding.) The female half mould was attached to the lower mould cradle.

A solution of polyvinyl alcohol was painted on the operative surfaces of the mould halves and a sheet of glass fibre mat (2 oz./sq. ft.) of appropriate size placed in the female mould, the edges overlapping the pinch-off. 800 gm. of the catalysed resin (equal parts by weight of Beetle 851 and Beetle 4128 resins, together with 4% by weight of a 50% benzoyl peroxide paste) was poured into the lower mould half and spread over the mat by means of a spatula. The mould halves were brought together and pressed for about 10 minutes, after which the mould was opened and the moulding removed.

EXAMPLE 2

Mould liners for a tea tray about 60 cm. long and 45 cm. wide were made in polyester/glass laminate, the thickness of each of the liner halves being about 3 mm. They were easily distortable. The liner halves were then backed with a polyurethane foam of density about 54 kg./cu. m. by pouring commercially available foaming composition on to the back of each of them, so that when the foam had cured to the rigid state a backed mould was obtained, each mould half being in the form of a rectangular block about 10 cm. thick faced with the polyester/glass mould liner. The polyester components of the mould, because of the dense foam backing, were now rigid and were no longer easily distortable, although relatively light in weight.

The mould halves were then clamped on to a suitable mould cradle in a press, the sides and back of the mould being supported by wood strips.

Mouldings were made in the conventional way, the glass mat and resin composition containing benzoyl peroxide as catalyst being placed in the female mould (after application of polyvinylalcohol to the faces of both mould halves as parting agent). The time needed in an unheatd mould for the moulding to reach a degree of cure when it could be removed from the press was 3 minutes from onset of gelation of the resin.

EXAMPLE 3

Male and female mould halves were made of polyurethane foam of density 110 kg./cu. m. The female mould was made by applying a commercially available foaming composition (Bibby's RM 12) directly to a male pattern of a tea tray 60 cm. long and 45 cm. wide. When the foam had cured the rigid foam half mould was removed from the pattern. The male mould was made in the conventional way by shaping the foam on a pattern consisting of a wax model of the shape of the final moulding, held in the female mould.

Male and female mould halves were obtained of dimensions about 75 cm. x 60 cm. x 15 cm. (the depth of the central depression in the tea tray was about 2.5 cm.).

It was found that these mould halves could be clamped directly to mould cradles as described above, without the use of any backing or lateral support.

The moulding was carried out as described in Example 1, except that no parting agent was applied to the mould faces.

EXAMPLE 4

A foam mould was made as described in Example 3, except that the pattern was painted with an aqueous solution of polyvinylalcohol before application of the foaming composition.

The coating of the parting agent was retained for an extended period.

What is claimed is:

1. An improved mould for moulding articles from exothermic bonding material reinforced with fiber material, said mould having a plurality of mating mould sections adapted to be moved to and from a position wherein said sections define a closed mould cavity, a resilient pinch-off means on at least one of said mould sections for holding said fiber material in position during hardening of said bonding material and for allowing gas and limited amounts of said bonding material to escape from said mould cavity.

2. A mould as defined in claim 1 wherein a pinch-off means is located on each of said mould sections.

3. A mould as defined in claim 1 wherein said pinch-off means is made from rubber material.

4. A mould as defined in claim 1 wherein said pinch-off means has a Shore hardness between 10 and 100°.

5. A mould as defined in claim 1 wherein said mould section has a thermal capacity less than 0.4 cal./sq. cm./° C. and a thermal conductivity less than 0.002 cal./sq. cm./sec./cm./° C.

6. A mould as defined in claim 1 wherein said mould sections are constructed from glass fiber reinforced resin.

7. A mould as defined in claim 6 wherein said mould sections have a wall of glass reinforced polyester shell with a thickness of between 6 and 12 millimeters.

8. In a mould for molding articles from exothermic bonding material reinforced with fiber material, said mould being of the kind having a pair of mating sections at least one of which is adapted to be moved toward the other to close the mold and to effect pressure on a fiber mat and a mass of exothermic bonding material in a cavity defined between said mould sections, the improvement which comprises a resilient pinch-off means for engaging and pinching the edges of the fiber mat to hold the latter in position as the mould closes and for allowing limited amounts of bonding material to escape from the cavity through the material of the mat as pressure is exerted on the bonding material, said pinch-off means including a strip of resilient material disposed around the edge of at least one of the mould sections and projecting toward the other mould section a distance such that it pinches and holds the fiber mat before any significant pressure is applied to the material in the mould cavity.

9. A mould as in claim 8 for moulding deep-draw articles wherein the improvement further includes a retainer disk adapted to fit into the mould cavity and supplementary pinch-off means including a strip of resilient material between the edge of said disk and the inner surface of one of said mould sections.

References Cited

UNITED STATES PATENTS

| 2,734,227 | 2/1956 | Costick et al. | 18—39 |
| 2,814,077 | 11/1957 | Moncrieff | 18—35X |
| 3,248,758 | 5/1966 | Schmitz et al. | 18—47X |
| 3,273,205 | 9/1966 | Hanley | 18—39 |

J. SPENCER OVERHOLSER, Primary Examiner

J. E. ROETHEL, Assistant Examiner

U.S. Cl. X.R.

18—19